US010974635B1

(12) United States Patent
Tiringo et al.

(10) Patent No.: US 10,974,635 B1
(45) Date of Patent: Apr. 13, 2021

(54) AUTOMOBILE BEVERAGE HOLDER

(71) Applicants: Theodros Tiringo, Culpeper, VA (US); Wesen Tiringo, Culpeper, VA (US)

(72) Inventors: Theodros Tiringo, Culpeper, VA (US); Wesen Tiringo, Culpeper, VA (US)

(*) Notice: Subject to any disclaimer, the term of this patent is extended or adjusted under 35 U.S.C. 154(b) by 0 days.

(21) Appl. No.: 16/740,790

(22) Filed: Jan. 13, 2020

(51) Int. Cl.
*B60N 3/00* (2006.01)
*B60N 3/10* (2006.01)

(52) U.S. Cl.
CPC ............ *B60N 3/104* (2013.01); *B60N 3/103* (2013.01)

(58) Field of Classification Search
CPC ................................ B60N 3/103; B60N 3/104
USPC ........................................................ 224/483
See application file for complete search history.

(56) References Cited

U.S. PATENT DOCUMENTS

| | | | | |
|---|---|---|---|---|
| 5,165,646 A * | 11/1992 | Gewecke | ............... | B60N 3/103 165/80.1 |
| 5,540,409 A * | 7/1996 | Cunningham | ......... | B60N 3/103 248/311.2 |
| 5,865,411 A | 2/1999 | Droste | | |
| 5,961,083 A * | 10/1999 | Hartmann | ............... | B60N 3/101 248/222.14 |
| 6,474,611 B1 * | 11/2002 | Deaton | ................... | B60N 3/102 165/41 |
| 6,560,983 B1 * | 5/2003 | Schimmeyer | .......... | B60N 3/103 248/311.2 |
| 9,657,890 B2 * | 5/2017 | Botello | ................... | F16M 13/02 |
| 9,821,722 B1 * | 11/2017 | Jones | ...................... | B60R 11/00 |
| 2007/0241152 A1 * | 10/2007 | Josephs | .................... | B60R 11/00 224/483 |
| 2014/0034697 A1 * | 2/2014 | Mak | ....................... | B60N 3/103 224/483 |

* cited by examiner

*Primary Examiner* — Peter N Helvey
(74) *Attorney, Agent, or Firm* — Sanchelima & Associates, P.A.; Christian Sanchelima; Jesus Sanchelima

(57) ABSTRACT

An automobile beverage holder including a holding assembly, a mounting assembly and a vehicle assembly is disclosed. The holding assembly includes a beverage holder having a sizing platform that allows for accommodating different size beverage containers within the beverage holder. The beverage holder includes a vent opening which allows for an air conditioning system to blow air for cooling or heating of the beverage container within the beverage holder. A hingedly mounted lid covers the beverage holder for accelerated heating or cooling. The mounting assembly includes a vent bracket which mounts to the beverage holder to allow for clips of the mounting assembly to attach to an air vent of an automobile. The clips allow for retrofitting of the beverage holder to existing automobiles. The clips also allow for quick attaching and detaching of the beverage holder. Importantly, the beverage holder is made of a temperature transferring material.

19 Claims, 4 Drawing Sheets

AUTOMOBILE BEVERAGE HOLDER

BACKGROUND OF THE INVENTION

1. Field of the Invention

The present invention relates to an automobile beverage holder and, more particularly, to an automobile beverage holder that can cool or heat a beverage using the air conditioning system of an automobile.

2. Description of the Related Art

Several designs for automobile beverage holders have been designed in the past. None of them, however, include a beverage holder which is removably attachable to an automobile heating and cooling vent, which is composed of a temperature transferring material, such as aluminum.

Applicant believes that a related reference corresponds to U.S. Pat. No. 5,865,411 for a beverage holder for use in a vehicle. Applicant believes another related reference belongs to 2002/0179282 for a beverage cup holder for cooling and heating the contents in the cup by using the vehicle air conditioning system. None of these references, however, teach of a beverage holder made of aluminum and being removably attached to an automobile heating and cooling vent. Further, none of the references teach of a beverage cooler with a lid to entirely enclose the beverage. Also, the present invention includes a spring-loaded platform that is capable of allowing for different sized beverages to be held in the beverage holder.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an automobile beverage holder that cools or heats the held beverage with the use of the air conditioning of an automobile.

It is another object of this invention to provide an automobile beverage holder that is made of a temperature transferring material.

It is still another object of the present invention to provide an automobile beverage holder that can be used with different sized beverage containers.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
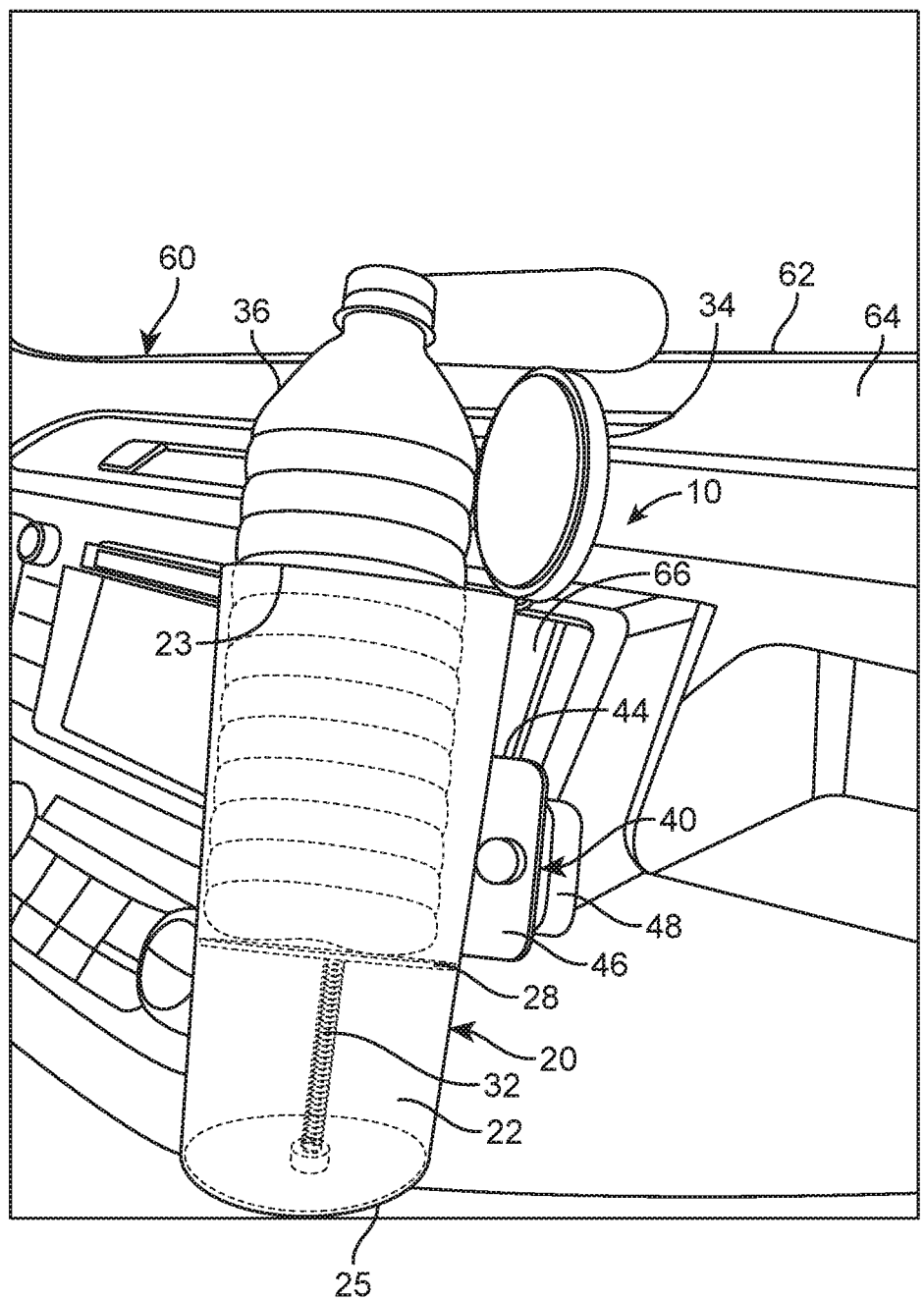
FIG. 1 represents the present invention in an operational setting.

Referring now to the drawings, where the present invention is generally referred to with numeral 10, it can be observed that it, automobile beverage holder 10, basically includes a holding assembly 20, a mounting assembly 40 and a vehicle assembly 60.

Figure 2:
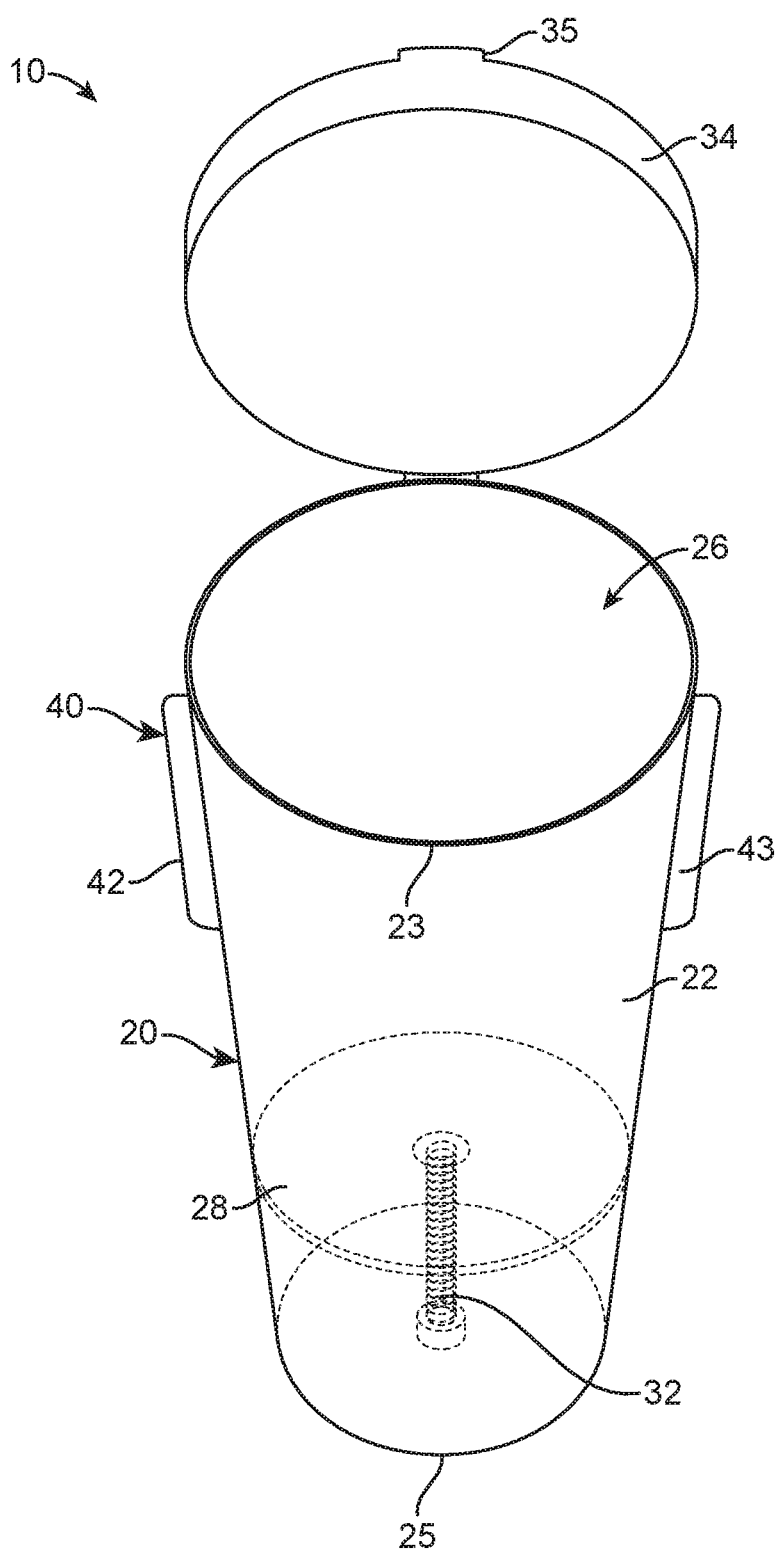
FIG. 2 shows an isometric view of the present invention in an open configuration.
Figure 3:
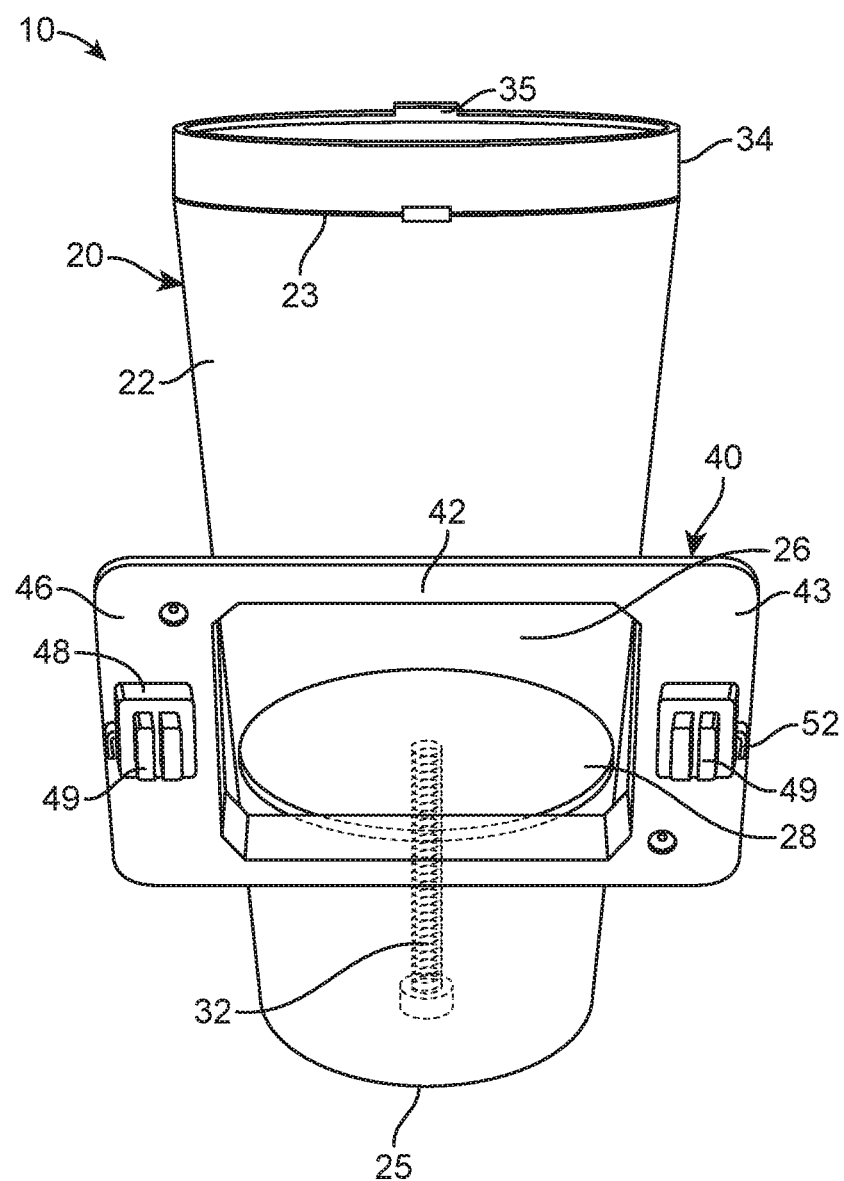
FIG. 3 illustrates a back view of the present invention to show the mounting mechanism of the present invention.
Figure 4:
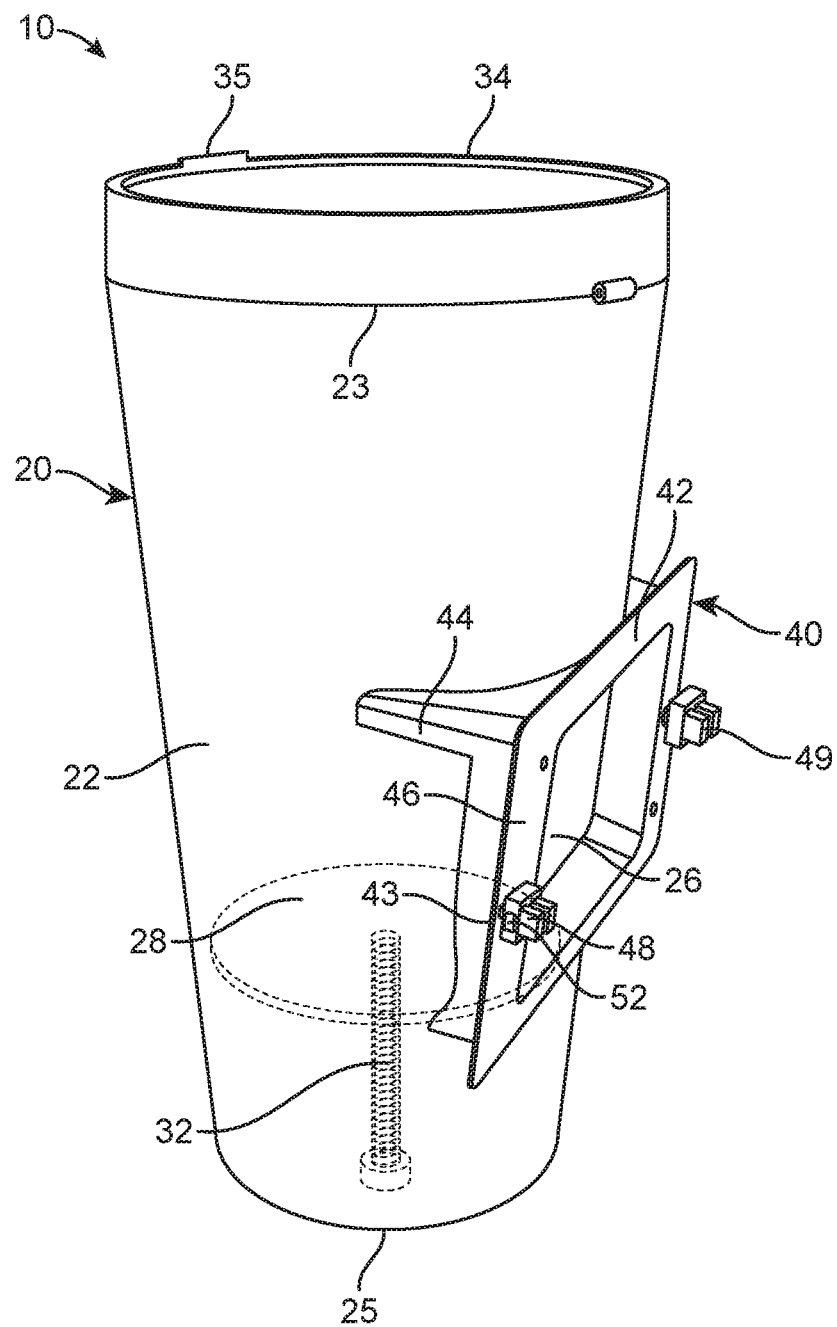
FIG. 4 shows a side view of the present invention to show further details of the mounting mechanism.

It can be seen that the automobile beverage holder 10 is shown in FIGS. 1-4. Holding assembly 20 includes a beverage holder 22. In one embodiment, beverage holder 22 may be a tapering cylindrical shape. It should be understood that it may be suitable for beverage container to be of a predetermined shape and dimensions. Importantly, beverage holder 22 may be made of a temperature transferring material such as aluminum, copper, stainless steel or the like. It may also be suitable for beverage holder 22 to be made to insulate as to be able to maintain temperatures over extended periods of time. Beverage holder 22 may include a top end 23 having a top opening 24 which permits access to an interior of beverage holder 24. A beverage container 36 may be inserted therein beverage holder 24 through top opening 24 for heating or cooling thereof. It should be understood that beverage holder 22 may be of predetermined dimensions that permit holding more than one of beverage container 36. Beverage holder 22 may also include a vent opening 26. Preferably, vent opening 26 may be located at a predetermined location about the perimeter of beverage holder 22. It should also be understood that vent opening 26 may be of a predetermined shape, despite being shown in a rectangular shape in the immediate embodiment. It should be understood that vent opening 26 may be of predetermined dimensions. Therein beverage holder 22 may be a sizing platform 28 and a spring 32. Sizing platform 28 may be of a shape that cooperates with fitting within the interior of beverage holder 22. In one embodiment, sizing platform 28 may preferably be entirely flat and circular. Underneath of sizing platform 28 may be spring 32. Spring 32 may extend from underneath of sizing platform 28 to a bottom end 25 of beverage holder 22. Spring 32 may be fully expanded when beverage holder 22 is not in use. Alternatively, spring 32 may be compressed once beverage holder 22 is in usage. Upon placing beverage container 36 within beverage holder 22, beverage container 36 may come in contact with sizing platform 28 and be pushed downwardly within beverage holder 22 and compressing spring 32. Spring 32 may be compressed until beverage container 36 is partially or fully in line with vent opening 26. Additionally, beverage holder 22 may include a hingedly mounted lid 34. Lid 34 may have an open and closed configuration which means beverage holder 22 may have an open and closed configuration that corresponds with the configuration of lid 34. Lid 34 may be of a dimension and shape that cooperates with top opening 24 to entirely cover top opening 24 once lid 34 is in the closed configuration. Lid 34 may be adapted to cover top opening 24 in order to heat or cool beverage container 36 held therein beverage holder 22 at an accelerated rate. In one embodiment, lid 34 may include a lifting portion 35 which allows for moving lid 34 from the closed configuration to the open configuration or vice versa.

Automobile beverage holder 10 further includes mounting assembly 40. Mounting assembly 40 may assist in securing and mounting the present invention to any vehicle as needed by a user. Mounting assembly 40 may include a vent bracket 42 which mounts about the perimeter of vent opening 26. Vent bracket 42 may be of dimensions and shape that cooperates with vent opening 26. Preferably, vent bracket 42 may be made of a plastic material for aiding in maintaining the present invention lightweight. However, it should be understood that other materials, such as aluminum, stainless steel, rubber or the like may also be suitable. Vent bracket 42 may direct air blowing from an air-condition system towards the inside of beverage holder 22 for cooling or heating of beverage container 36 held therein. Vent bracket 42 may include lateral sides 43. On each of lateral sides 43 may be a vent clip surface 46. Mounted thereto vent clip surface 46 may be a vent clip 48 with a jaw 49. Vent clip 48 may be adapted to be attached to an automobile heating and cooling vent 66. It may be suitable to include at least one vent clip 48 with the present invention. Each of vent clip 48 may have an open and closed configuration for jaw 49. The open and closed configuration is achieved through a clip lock 52 which can be raised or lowered, respectively. Mounted adjacent to each of vent clip 48. Extending rearwardly from vent bracket 42 may be a holder bracket 44. Holder bracket 44 may be adapted to allow mounting of mounting assembly 40 to beverage holder 22. More specifically, holder bracket 44 may be adapted to allow mounting of vent bracket 42 to beverage holder 22. Holder bracket 44 may partially extend along the perimeter of beverage holder 22.

The present invention may further include vehicle assembly 60. Vehicle assembly 60 may include an automobile 62 having an automobile interior 64 wherein automobile heating and cooling vent 66 is located. In order to mount holding assembly 20 to vehicle assembly 60, mounting assembly 40 is used. More specifically, vent clip 48 is set to the open configuration with clip lock 52 to engage automobile heating and cooling vent 66 and jaw 49 is set to the closed configuration to secure the present invention. Automobile heating and cooling vent 66 becomes a dedicated vent for cooling or heating thereof beverage holder 22. The heating or cooling of beverage holder 22 depends upon whether the air condition unit of automobile 62 is set to blow hot or cold air. It may be preferable for beverage container 36 to be in front of vent opening when the present invention is in use. With the present invention, it is possible to heat or cool any beverage container 36 held therein beverage holder 22 as beverage holder 22 is made of a temperature transferring material. The present invention helps to maintain the temperature of drinks or beverages as well.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for an automobile beverage holder, comprising:
   a. a vehicle assembly including a vehicle having an automobile interior with an automobile heating and cooling vent within said automobile interior;
   b. a holding assembly including a beverage holder having a top end, said beverage holder including a top opening at said top end, said holding assembly further including a vent opening at a predetermined location along a circumference of said beverage holder, said vent opening extending a width of said beverage holder, said holding assembly also including a beverage container to be received within said beverage holder through said top opening;
   c. a mounting assembly mounted to said vent opening, said mounting assembly including a vent bracket secured to said beverage holder about an entire perimeter of said vent opening, said vent bracket including a bracket opening that cooperates and aligns with said vent opening when said vent bracket is secured to said beverage holder, said vent bracket including a holder bracket extending outwardly and away from said vent opening, said holder bracket including a rear curvature that cooperates with a shape of said beverage holder, said holder bracket extending partially along the circumference of said beverage holder with said rear curvature in constant abutting contact with said beverage holder, said vent bracket including lateral sides each having a vent clip surface, said vent clip surface each including a vent clip mounted thereon, said vent clip on each of said lateral sides being away from said vent opening and said bracket opening, said vent opening being located entirely between the vent clip on each of the lateral sides; and
   d. said vent clip engaging said automobile heating and cooling vent to secure said vent clip and further said beverage holder to said automobile heating and cooling vent, said automobile heating and cooling vent blowing one of hot or cold air inside of said beverage holder through said vent opening which further heats or cools, said beverage container housed inside of said beverage holder with the air blown from said automobile heating and cooling vent.

2. The system of claim 1, wherein said beverage container is made of a temperature transferring material.

3. The system of claim 2, wherein said temperature transferring material being one of aluminum, copper, or stainless steel.

4. The system of claim 1, wherein said beverage container is visible through said vent opening.

5. The system of claim 1, wherein said beverage container is insulated to maintain a desired temperature inside of said beverage container.

6. The system of claim 1, wherein said beverage holder includes a spring at an interior of said beverage holder, said spring extending from a bottom end of said beverage holder, said spring having a sizing plate mounted thereon, said spring and sizing plate allow for said beverage holder to house beverage containers of different dimensions by having said spring compress a necessary amount.

7. The system of claim 1, wherein said beverage holder includes a lid hingedly mounted at said top end.

8. The system of claim 7, wherein said lid allows for said beverage holder to have an open configuration and a closed configuration.

9. The system of claim 8, wherein said lid includes a lifting portion that allows for said lid to open or close to allow for said beverage holder to be positioned in the closed or open configuration.

10. The system of claim 1, wherein each of said vent clip have a jaw to engage said automobile heating and cooling vent, said automobile heating and cooling vent sandwich between said jaw when said beverage holder is secured to said automobile heating and cooling vent.

11. The system of claim 10, wherein said vent clip has a clip lock on an outer lateral side thereof, said clip lock opens and closes said jaw to remove or secure, respectively, said beverage holder from said automobile heating and cooling vent.

12. The system of claim 1, wherein said beverage container is directly in front of said vent opening.

13. A system for an automobile beverage holder, consisting of:
   a. a vehicle assembly including a vehicle having an automobile interior with an automobile heating and cooling vent within said automobile interior;
   b. a holding assembly including a beverage holder having a top end and a bottom end, said beverage holder including a top opening at said top end, said beverage holder including a spring at an interior of said beverage holder, said spring extending from said bottom end, said spring having a sizing plate mounted thereon, said beverage holder having a lid hingedly mounted at said top end, said lid allowing for said beverage holder to have an open configuration and a closed configuration, said lid including a lifting portion that allows for said lid to be positioned in the closed or open configuration, said holding assembly further including a vent opening at a predetermined location along a circumference of said beverage holder, said holding assembly also including a beverage container to be received within said beverage holder through said top opening, said beverage container being atop of said sizing platform, said beverage container pushed downwardly within said beverage holder until said beverage container is substantially in front of said vent opening, said sizing platform and said spring allowing for said beverage holder to house said beverage container of different dimensions;
   c. a mounting assembly mounted to said vent opening, a vent bracket secured to said beverage holder about an entire perimeter of said vent opening, said vent bracket including a bracket opening that cooperates and aligns with said vent opening when said vent bracket is secured to said beverage holder, said vent bracket including a holder bracket extending outwardly and away from said vent opening, said holder bracket including a rear curvature that cooperates with a shape of said beverage holder, said holder bracket extending partially along the circumference of said beverage holder with said rear curvature in constant abutting contact with said beverage holder, said vent bracket including lateral sides each having a vent clip surface, said vent clip surface each including a vent clip mounted thereon, each of said vent clip having a jaw and a clip lock which allows for said jaw to open and close, said clip lock being raised to open said jaw, said clip lock being lowered to close said jaw, said vent clip on each of said lateral sides being away from said vent opening and said bracket opening, said vent opening being located entirely between the vent clip on each of the lateral sides; and
   d. said jaw of vent clip being opened to engage said automobile heating and cooling vent and said jaw closing with said clip lock to secure said vent clip and further said beverage holder to said automobile heating and cooling vent, said automobile heating and cooling vent blowing one of hot or cold air inside of said beverage holder through said vent opening which further heats or cools, respectively, said beverage container housed inside of said beverage holder, said beverage holder is made of a temperate transferring material.

14. The system of claim 1, wherein said vent bracket has a width greater than said beverage holder.

15. The system of claim 1, wherein a spacing is defined between said vent clip on each of the lateral sides of said vent bracket and said bracket opening.

16. The system of claim 11, wherein said clip lock is raised to open said jaw, said clip lock is lowered to close said jaw.

17. The system of claim 1, wherein said vent bracket includes a perimeter spacing, said perimeter spacing having dimensions greater than said vent opening, said perimeter spacing entirely surrounding said bracket opening along the circumference thereof.

18. The system of claim 10, wherein said jaw extends vertically along said vent bracket.

19. The system of claim 1, where said beverage holder is cylindrical and tapered.

* * * * *